Aug. 27, 1935.  H. CUNNINGHAM  2,012,270
PROCESS AND APPARATUS FOR THE PRODUCTION OF TELEVISION IMAGES
Filed Dec. 8, 1931
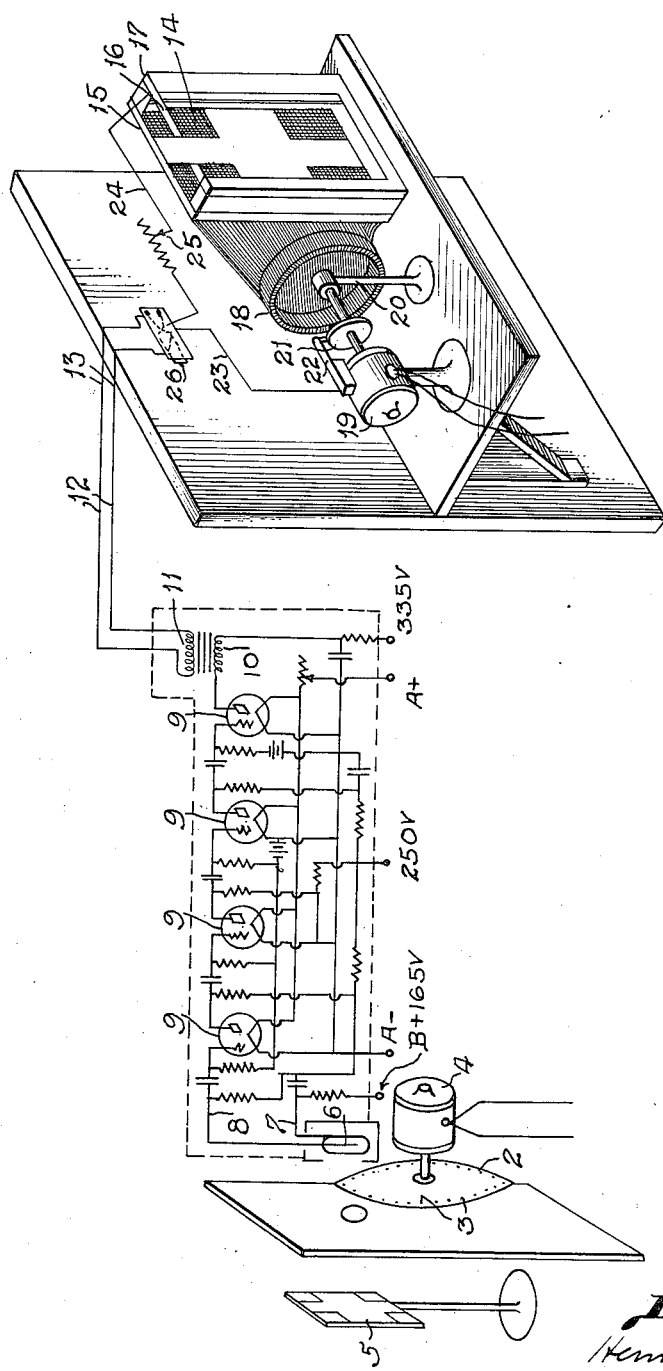

Patented Aug. 27, 1935

2,012,270

UNITED STATES PATENT OFFICE 2,012,270

PROCESS AND APPARATUS FOR THE PRODUCTION OF TELEVISION IMAGES

Henry Cunningham, Cleveland, Ohio

Application December 8, 1931, Serial No. 579,823
In Germany December 8, 1930

13 Claims. (Cl. 178—6)

In television, it has been customary heretofore to receive a visual-image as formed by the optical impression produced by a varying light, as viewed by aid of rapidly moving openings. Necessarily with such an arrangement, a fundamental handicap is introduced in that the illumination is limited at best, and such usage is restricted to small direct-viewed installations. In accordance with the present invention (for which I have filed an application in Germany, December 8th, 1930), limitations of a primary variable light are avoided, and picture images may be received in terms of contrast as produced by electro-chemical change. Such electro-chemical change may be provided in a receiving field made up of a multitude of points, each concerned in an electrolytic change producing contrasts of light and shade in the receiving field of the picture corresponding to the similar lights and shades in the original field of vision at the transmitter. In the receiving field, the points may be small or large, depending upon the size of the installation desired, and the manner of application, and the manner of viewing. For instance, with a small installation for direct viewing at close range, the points in the receiving field may be small and closely spaced, such as on the order of 60 per inch, being thus comparable to the light and dark points in certain photo-engraving images. For installations for direct viewing but at a greater distance, the points may be for instance of a size and spacing of 8 or fewer per inch. Again, where, instead of direct viewing, the picture image as formed is reflected and projected in the manner of a stereopticon-projection upon a viewing-screen, the defining points in the receiving field may be quite small, or larger, depending upon the focal distance of the pick-up.

The points as referred to in the receiving field are in effect individual electrodes, which receive the current as distributed and synchronized in accordance with the transmitter, the synchronization being accomplished by any suitable or preferred means. Again, the transmission may be by radio or by wire, as desired in any particular instance. The electrodes constituting the plurality of controlled points in the receiving field may be of a material directly contributing to the reaction, or in some instances of a material non-reactive, and merely introducing the current to a locus where reaction may be circumscribed to the area concerned. Conveniently, such a receiving field may be mounted such that the multitude of point electrodes are carried in an insulating base allowing the application of a film or thin layer of liquid electrolyte, the other electrode paired against the multitude of electrode-points in the field being at the side or about the area so provided. Depending upon the electrolytic materials and the particular reactions produced, picture-image effects in black and white or in color may be had.

By way of illustration, the accompanying drawing indicates the principle of the invention, such showing being in simple terms for ready comprehension.

In such drawing:—

The sole figure is a diagrammatic showing of apparatus illustrative of the principle of the invention.

In said figure of the drawing there is shown a scanning disc 2 having holes 3 arranged in spiral rows, the disc being driven by an electric motor 4 so as to rapidly sweep the openings 3 across the line of sight between an object 5 to be viewed, and a photo-electric cell 6, a suitable cabinet or casing enclosing the same. The object to be viewed, while here indicated as a simple geometric figure, will of course in practice be any field of vision which it is desired to transmit. The photo-electric cell 6 is connected by wires 7, 8, to an amplifier comprising thermionic tubes 9, and being coupled by resistances and condensers in any usual or preferred circuit arrangement, the output from the last thermionic tube or valve 9 proceeding to the winding 10 of a transformer whose winding 11 is in ratio to preferably give a step-down in voltage and an increase in amperage. From the winding 11, wire connections 12 may lead for wire-transmission directly to the input leads 13 at the receiver station; or for radio, the output of connections 12 may be amplified and modulated onto a carrier wave, and thence be broadcast. In this, a plurality of electrodes 14 are arranged closely on a backing or support 15 of insulating material, the electrodes being in lines corresponding to the path followed by the scanning-openings 3 in their traverse across the original viewing field; that is, to the extent that the paths of the scanning-openings are somewhat arcuate, correspondingly the rows of the electrodes 14 in the receiver will be of similar arcuate arrangement. Each of the electrodes 14 are exposed in a bath supplying the reagents to be involved in the reaction. Another general electrode 16 is provided, for instance in the form of a narrow strip spaced from and insulated from the general bank of electrodes which are on the back-wall. A glass face or cover-plate 17 suitably mounted may provide an unobstructed closure for the bath. Each of the electrodes 14 may be connected to a corresponding commutator-segment on a commutator 18 driven by electric motor 19 in synchronism with the transmitting motor 4, the circuit being completed through the commutator-brush 20 and the motor shaft, and the collector ring 21 and brush 22 connected in turn with the wire 23. The general electrode 16 is connected by a wire 24 through a regulating rheostat 25 to the input lines 13. A double-pole double-throw switch 26 is advisably interposed and according as this is connected one way or another, the correct polarity for the particular materials being used at the receiving electrodes may be controlled. A positive or a negative image may be had in accordance with polarity of connections in the transmitter or the number of stages of amplification. Where the current as received by the input line 13 is too weak to satisfactorily operate the electrolytic action, a local amplifier current, battery or otherwise, may be provided in the circuit, 23, 24.

Depending upon the electrolytic materials and the particular reaction produced, picture-image effects in black and white or in color may be had. For example, the electrodes 14 may be of metallic silver, and with a thin layer of liquid thereover composed of a silver nitrate solution about 1 per cent, acidified with nitric acid about 1 per cent. On supply of electric current in synchronization and distribution to the electrode-field, those points receiving current impulses will correspondingly become black from formation of silver peroxide, while others remain white, forming the contrasting lights and shades in consonance with the transmission field of vision. Instead of silver, other metals, as lead, copper, etc., may be employed for the electrode material. According as the current impulses are stronger or weaker, the darkening on the electrode points may be from brown or grey to black. Or, the electrode points 14 may be of non-reactive material, such as platinum and the liquid layer thereover may be an ionizable salt solution, such as sodium sulphate about 4 per cent with a few drops of a 1 per cent solution of phenol-phthalein. With the synchronized distribution of electric current, certain of the points will show red while others remain white, thus providing the contrast of light and shade in accordance with the original image-field. With non-reactive electrodes and an ionizable salt solution, or acid or alkali, and an indicator such as methyl orange in the liquid layer over the electrodes, corresponding color contrasts may be had. In all these cases, the coloration is synchronized with the electric impulse, and passes therewith, the speed-rate being such that the persistence in the eye of a person viewing the receiving screen will give the effect of a complete image representation, as well understood in the television art.

By providing receiving-fields operating in two or more colors, each field having its own color as synchronized with the light and shade of the original transmission, and by then reflecting these fields in superposition upon a viewing-screen, pictures in natural colors may be had. Similarly, the image field as produced by any receiver may be reflected and projected in enlargement upon a viewing-screen in proportions as may be desired. Thus the invention affords a versatility in size and usage accommodation, in black and white, in plain color or in combination colors as in any instance desired. And by having an acid or self-clearing agent initially present, the electro-chemical action at a given point is evanescent, that is it ceases on cessation of the current-flow and the change in appearance at that point produced by the current is promptly effaced and the primarily clear or colorless state restored. Highly rapid picture-change effects accordingly can be had, as not possible otherwise.

Other modes of applying the principle of my invention may be employed instead of the one explained, change being made as regards the means and the steps herein disclosed, provided those stated in any of the following claims, or their equivalent be employed.

I therefore particularly point out and distinctly claim as my invention:—

1. A process for producing television pictures in which of a plurality of points in the picture-field some appear as light points and others as dark points to make up the lights and shades of the picture on a clear chemical ground, said process comprising appropriately inciting evanescent electro-chemical change at various points in the visual field corresponding to electric currents from like points in the original, and clearing such electro-chemical change on current cessation, by a chemical agent initially present.

2. A process in accordance with claim 1, comprising inciting the electro-chemical action in colors which disappear with cessation of the currents.

3. A process in accordance with claim 1, comprising inciting the electro-chemical action in contrasting colors.

4. A process for producing television pictures in which of a plurality of points in the picture-field some appear as light points and others as dark points to make up the lights and shades of the picture, said process comprising appropriately inciting electro-chemical change at various points in a plurality of visual fields corresponding to electric currents from like points in the original, such electro-chemical change being in different colors in the different visual fields, and combining the color effects in another visual field in common to produce a picture in natural color effect.

5. A process for producing television pictures in which of a plurality of points in the picture-field some appear as light points and others as dark points to make up the lights and shades of the picture, said process comprising appropriately inciting electro-chemical action at various points in the visual field corresponding to electric currents from like points in the original, and reflecting the so-produced picture upon another viewing-screen.

6. A process for producing television pictures in which of a plurality of points in the picture-field some appear as light points and others as dark points to make up the lights and shades of the picture, said process comprising appropriately inciting electro-chemical action at various points in the visual field corresponding to electric currents from like points in the original, similarly separately producing another like picture in a different color, and reflecting the respective pictures superposedly upon a viewing-screen.

7. Television apparatus, comprising a screen composed of a plurality of electrolytic electrodes and a self-clearing solution, and a transparent cover thereover.

8. Television apparatus comprising a screen composed of a plurality of metal electrodes banked together and insulated from each other, a self-clearing chemical reactant in common, and a circuit-completing electrode in common.

9. Television apparatus comprising a screen composed of a plurality of electrolytic electrodes, a self-clearing chemical reactant thereover in common, and a transmitting means to impress electric currents variously upon the different electrodes in accordance with excitations at corresponding points in the original visual-field.

10. Television apparatus, comprising a screen composed of a plurality of electrolytic electrodes, a chemical reactant thereover in common, and a transmitter including a light-scanning means and current-transfer means.

11. Television apparatus, comprising a screen composed of a plurality of electrolytic electrodes, a chemical reactant thereover in common, a transmitter including a scanning-means, and a motor for driving the same.

12. Television apparatus, comprising a screen composed of a plurality of electrolytic electrodes banked together and insulated separately, a chemical reactant thereover in common, a plurality of wires leading to such electrodes, a commutator controlling said wires, a motor for driving said commutator, and a transmitter including a light-scanning means operated in synchronism with the said commutator driving motor.

13. Television apparatus, comprising a screen composed of a plurality of electrolytic electrodes banked together and insulated separately, a chemical reactant thereover in common, a plurality of wires leading to such electrodes, a commutator controlling said wires, a motor for driving said commutator, a transmitter including a scanning-means, and a motor for driving the same in synchronism with the said commutator-driving motor.

HENRY CUNNINGHAM.